United States Patent Office 3,819,604
Patented June 25, 1974

---

3,819,604
6,9,21-TRIHALOGENOSTEROIDS
Ulrich Kerb, Karl Heinz Kolb, and Gunter Klink, Berlin, Germany, assignors to Schering Aktiengesellschaft, Berlin and Bergkamen, Germany
No Drawing. Continuation of application Ser. No. 9,246, Sept. 30, 1969. This application June 5, 1972, Ser. No. 259,819
Claims priority, application Germany, Oct. 2, 1968, P 18 01 390.6
Int. Cl. C07c *173/00*
U.S. Cl. 260—239.55 R                 10 Claims

ABSTRACT OF THE DISCLOSURE 6,9,21-trihalogenosteriods of the formula

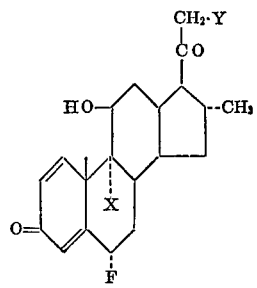

(I)

wherein X is fluorine, chlorine or bromine and Y is chlorine or fluorine. The compounds are made by subjecting a steroid of the general formula

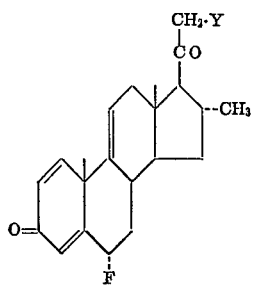

(II)

wherein Y has the same meaning as above to reaction with a hypohalogenous acid of the type HOX′ wherein X′ is chlorine or bromine and if it is desired that X be fluorine then converting the 9α-chlorine or -bromine-11β-hydroxy compound to the 9,11-epoxide followed by opening of the epoxide ring with hydrogen fluoride.

---

The invention also embraces the starting products of the formula (II) above given.

The compounds have a strong antiinflammatory action.

This is a continuation of application Ser. No. 9,246 filed Sept. 30, 1969.

BACKGROUND OF THE INVENTION

6α-fluoro-16α-methyl-1,4-pregnadienes-3,20-dione have arleady been used as anti-inflammatory agents. The well known product of this type is 6α-fluoro-11β,21-dihydroxy-16α-methyl-1,4-pregnadiene-3,20-dione.

SUMMARY OF THE INVENTION

The compounds of the present invention are 6,9,21-trihalogenosteriods of the formula

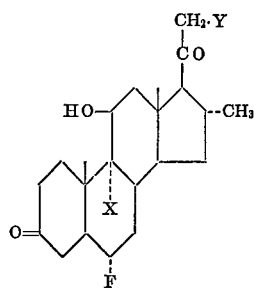

(I)

wherein X is fluorine, chlorine or bromine and Y is chlorine or fluorine. The invention also embraces a process for making the defined compounds by subjecting a steroid of the formula

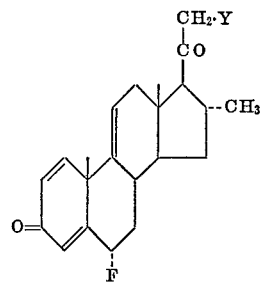

(II)

wherein Y has the meaning as above to reaction with an agent adapted to liberate an HOX′ acid wherein X′ is chlorine or bromine so as to form an addition reaction with the 9,11-double bond of the starting compound, the halogen atom attaching to the 9-position and the hydroxyl group attaching to the 11-position. If it is desired that X be fluorine, the thus-obtained compound is then reacted with a basic agent to convert the compound to the 9,11-epoxy compound and reacting the latter compound with hydrogen fluoride to open the epoxy ring and form the 9-fluoro-11β-hydroxy compound.

The invention also embraces the starting products of the formula (II) just given.

The invention furthermore includes pharmaceutical compositions wherein an effective amount of the compounds of formula (I) is present together with a carrier which is pharmaceutically accepted.

The invention furthermore concerns a methods for treating a patient for an inflammatory condition by administering to the patient an effective amount of the compounds of formula (I) by topical, oral or parenteral administration.

DESCRIPTION OF THE PREFERRED EMBODIMENTS

The addition reaction between the hypohalogenous acid and the 9,11-double bond of the starting compounds (II) can be effected in various manners, preferably by treating the 9,11-double bond with an agent during the coarse of the reaction which liberates NOX′ wherein X is chlorine or bromine. Such agents are, for instance, dibromodimethylhydantoin, N—X′-acylamide, particularly N-bromo or -chloro-acetamide, or N—X′-acylamide, particularly N-bromo- or chloro-succinimide.

If it is desired to obtain a 6,9,21-trihalogenosteroid with a 9α-fluoro substitution, the compound obtained by the HOX' addition reaction, that is the 9α-bromo or chloro-11β-OH substituted compound, is then reacted with a basic agent such as NaOH, KOH, $K_2CO_3$, potassium acetate, pyridine, etc. This reaction is preferably carried out at an elevated temperature. There is thus formed on the product a 9,11-oxido ring which subsequently is opened up by a reaction with hydrogen fluoride so as to form the 11β-OH-9α-fluoro grouping.

Utility

The 6,9,21-trihalogenosteroids of the invention are characterized by a strong anti-inflammatory action as appears from the following table in which the compound (b) of the invention, to wit, 6α-fluoro-9α,21-dichloro-11β-hydroxy-16α-methyl-1,4-pregnadiene-3,20 - dione is compared with the prior-art compound, 6α-fluoro-11β,21-dihydroxy-16α-methyl-1,4-pregnadiene-3,20-dione.

The intensity of the action was determined by the well known vaso constriction test wherein small, medium and high vasoconstriction is assigned values between 0 and 100. The test was carried out with healthy male subjects of the age between 18 and 38. The effective agent of the invention was applied in a water-oil base ointment at concentrations of 0.01; 0.001 and 0.0001%. The table shows the following results:

TABLE

| Active compound | Dose in percent | Observation time— | | | | | | |
|---|---|---|---|---|---|---|---|---|
| | | 1 hr. | 2 hr. | 3 hr. | 4 hr. | 5 hr. | 6 hr. | 7 hr. |
| (a) 6α-fluoro-11β, 21-dihydroxy-16α-methyl-1,4-pregnadiene-3,20-dione. | 0.01 | 0 | 25 | 40 | 50 | 100 | | |
| | 0.001 | 0 | 20 | 55 | 75 | 100 | | |
| | 0.0001 | 0 | 15 | 25 | | 50 | 90 | 100 |
| (b) 6α-fluoro-9α,21-dichloro-11β-hydroxy-16α-methyl-1,4-pregnadiene-3,20-dione. | 0.01 | 12 | 47 | 89 | 100 | | | |
| | 0.001 | 11 | 44 | 72 | 100 | | | |
| | 0.0001 | 0 | 29 | 48 | 88 | 100 | | |

As the test results show, the 6,9,21-trihalogenosteroids throughout have a distinctly higher intensity of action, compared with the prior-art compound (a). In addition they have a significantly earlier inception of the action and also reach the maximum action faster.

The compounds of the invention do not result in any sodium retention. They have a light diuretic effect.

The compounds may be administered by oral or topical administration and also by any kind of parenteral administration. They are administered as usual in combination with carrier and diluents as customary in gallenic pharmacy.

They are particularly suited for instance for the following treatments:

(a) Topical, contact dermatitis, various types of eczema, neurodermatitis, erythrodermia, burns, pruritus vulvae et ani, rosacea, erythematodes cutaneous, psoriasis, lichen ruber planus verrucosus;

(b) Oral: acute and chronic polyarthritis, neurodermitis, bronchial asthma, hay fever, etc.

A preferred doses range is about as follows:

Ointment: 0.0001 to 0.1% affective agent
Tablets: 0.01 to 50 mg. per tablet
Eye, nose and ear drops: 0.01 to 1.0% effective agent.

The pharmaceutical compositions may be in the form of ointments, tablets, eye-drops, nose-drops or ear-drops, as desired. They can also be prepared in the form of solutions suited for injection. Preferably, the pharmaceutical compositions should contain the following amounts of the compounds of the invention:

1. ointments: 0.0001 up to 0.1% active ingredient
2. tablets: 0.01 to 50 mg. per tablet
3. eye-, nose- and ear-drops: 0.01 to 1% active ingredient
4. solutions for injection: 0.1 to 10% active ingredient Preferably, the composition is applied in a dose of about 1 to 100 mg. in the case of an ointment, about 1 to 10 tablets, about 1 to 20 drops, and 0.1 to 3 ml. solution for injection, respectively, per day.

Starting Products

As has been indicated the starting compounds for making the products of the invention are 1,4,9(11)-pregnatriene compounds of the formula (II). Since these compounds have not been described in publications, it is necessary to say a few words about the process of making the compounds. This process can for instance start from the well known 6α-fluoro - 21 - acetoxy-16α-methyl-14,9(11)-pregnatriene-3,20-dione. The 21-acyloxy group of this compound can for instance be subjected to saponification in methanol methylene chloride with potassium hydroxide at a temperature between 0 and 5° C. so as to form the 21-alcohol with a melting point between 190 and 192° C. By a further esterification of the free 21-hydroxyl group with sulfochlorides, for instance methanesulfonic acid chloride in pyridine at a temperature between 0 and 5° C. there is first obtained 6α-fluoro-21-mesyloxy-16α-methyl-1,4,9(11)-pregnatriene-3,20-dione, M.P. 149–150° C. The 21-mesyloxy group of this compound is finally exchanged, for instance in solution in dimethylformamide and preferably at an elevated temperature, with the halogen atom finally desired in the X position: for instance with potassium hydrogen fluoride the corresponding 21-fluoro compound is obtained, with lithium chloride the 21-chlorine compound is the reaction product. However, the 21-chlorine compound can also be obtained from the 21-alcohol (M.P. 190–192° C.) by treatment with thionyl chloride in pyridine.

The following examples will further illustrate the invention.

Example 1

5,5 g. of 6α - fluoro - 21 - chloro-16α-methyl-1,4,9(11)-pregnatriene-3,20-dione, M.P. 208–209° C. were dissolved in 100 ml. tetrahydrofuran and then reacted with 5.5 g. N-chlorosuccinimide and 14 ml. 1 N perchloric acid and subjected to stirring at 35° C. for 2½ hours. The solution was then poured into ice water and the precipitate was removed by suction, washed neutral and dried. The thus-obtained 6α-fluoro - 9,21 - dichloro-11β-hydroxy-16α-methyl-1,4-pregnadiene-3,20-dione was recrystallized from acetone/hexane; M.P. 233–235° C.; yield 90% of the theoretical yield : UV: $\epsilon_{238}=15,800$.

Example 2

7 g. of 6α-fluoro-21-chloro-16α-methyl-1,4,9(11)-pregnatriene-3,20-dione were dissolved in 150 ml. tetrahydrofuran and then reacted with 10.5 g. N-bromosuccinimide and 65 ml. 1 N-perchloric acid. The solution was then stirred at 35° C. for 15 minutes and finally poured into ice water, whereupon sodium sulfite was added and the mass was stirred for 30 minutes. The precipitate was removed by suction, washed neutral and dried. After recrystallization from acetone/hexane there were obtained 6.9 g. 6α-fluoro-21-chlor-9-bromo-11β-hydroxy-16-methyl-1,4-pregnadiene-3,20-dione; M.P. 218° C. (decomposition); UV: $\epsilon_{241}=14,500$.

Example 3

8.6 g. of 6α-fluoro-21-chloro-9-bromo-11β-hydroxy-16α-methyl - 1,4 - pregnadiene-3,20-dione as obtained by the process of Example 2 were heated in 160 ml. ethanol and 40 ml. tetra hydrofuran together with 16 g. of potassium acetate for 45 minutes while applying reflux. The mixture was then stirred into ice water and the precipitate was removed by suction, washed with water and dried. The isolated crude product was subjected to chromatography on silica gel. By elution with hexane-acetone mixtures there was obtained 6α-fluoro-21-chloro-9,11β-epoxy-16α - methyl - 9β - pregna-1,4-diene-3,20-dione; M.P. 139–139.5° C. (isopropyl ether); UV: $\epsilon_{248}$=15,800.

15 ml. dimethylformamide were cooled to —15° C. and reacted upon stirring wtih 15 ml. hydrogen fluoride. 3.15 g. of the thus obtained 6α-fluoro-21-chloro-9,11β-epoxy-16α-methyl-9β-pregna-1,4-diene-3,20-dione were dissolved in 5 ml. dimethylformamide and where then added dropwise to the mixture of dimethylformamide and hydrogen fluoride and permitted to stand for 18 hours at 5° C. and thereafter for 9 hours at 20° C. The solution was then poured into ice water/potassium bicarbonate and the precipitate was removed by suction, dried and recrystallized from acetone/hexane. There was obtained 6α,9-difluoro-21-chloro-11β-hydroxy - 16α - methyl - 1,4 - pregnadiene-3,20-dione with a melting point of 215–216° C. (decomposition); UV: $\epsilon_{238}$=16,200; yield 80% of the theoretical yield.

Example 4

3 g. of 6α-21-difluoro-16α-methyl-1,4,9(11)-pregnatriene-3,20-dione (M.P. 229–231° C.) were reacted in 70 ml. tetrahydrofuran with 3 g. N-chlorosuccinimide and 24 1 N-perchloric acid and further treated as described in Example 1. There was obtained 6α,21-difluoro-9-chloro-11β-hydroxy-16α-methyl - 1,4 - pregnadiene-3,20-dione which after recrystallization from acetone/benzene melted at 255–256° C. UV: $\epsilon_{238}$=15,900; yield 65% of the theoretical yield.

Example 5

9.8 g. of 6α,21-difluoro-16α-methyl-1,4,9(11)-pregnatriene-3,20-dione were stirred for 10 minutes at 35° in 210 ml. tetrahydrofuran together with 14.7 g. N-bromosuccinimide and 91 ml. 1 N-perchloric acid and were further treated as described in Example 2. There was obtained 6α,21 - difluoro-9-bromo-11β-hydroxy - 16α - methyl-1,4-pregnadiene-3,20-dione which was recrystallized from acetone and had a melting point of 210° C. (decomposition); yield 98% of theoretical yield.

Example 6

10 g. of 6α,21-difluoro - 9 - bromo - 11β - hydroxy-16α-methyl-1,4-pregnadiene - 3,20 - dione, the compound obtained in Example 5, were reacted in 250 ml. ethanol and 100 ml. tetrahydrofuran with 20 g. anhydrous potassium acetate. The mass was then heated for 16 minutes while refluxing and was further treated as described in Example 3. The thus obtained 6α,21 - difluoro - 9,11β - epoxy-16α-methyl-9β-pregna - 1,4 - diene-3,20-dione melted at 177–179° C.; yield 92% of the theoretical yield.

7.6 g. of the thus obtained 6α,21-difluoro-9,11β-epoxy-16α - methyl - 9β - pregna-1,4-diene-3,20-dione were introduced at —20° C. in a mixture of 40 ml. dimethylformamide and 40 ml. hydrogen fluoride and subjected to stirring at room temperature for 24 hours. The further processing of the reaction mixture was carried out as described in Example 3. The thus obtained 6α,9,21-trifluoro-11β - hydroxy-16α-methyl-1,4-pregnadiene-3,20-dione was recrystallized from acetone/hexane and had a melting point of 287–289° C., upon decomposing. The yield was 80% of the theoretical yield.

We claim:
1. 6,9,21-trihalogenosteroids of the formula

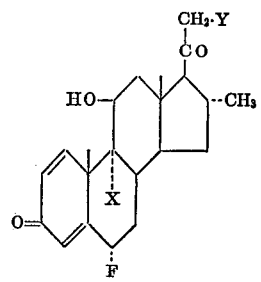

(I)

where X is chlorine or bromine and Y is fluorine or chlorine.

2. A compound as defined in claim 1 which is 6α-fluoro - 9,21 - dichloro - 11β - hydroxy - 16α - methyl-1,4-pregnadiene-3,20-dione.

3. A compound as defined in claim 1 which is 6α-fluoro-21-chloro - 9 - bromo - 11β - hydroxy - 16α - methyl-1,4-pregnadiene-3,20-dione.

4. A compound as defined in claim 1 which is 6α,21-difluoro - 9 - bromo - 11β - hydroxy - 16α - methyl - 1,4-pregnadiene-3,20-dione.

5. A compound as defined in claim 1 which is 6α,21-difluoro - 9 - chloro - 11β - hydroxy - 16α - methyl-1,4-pregnadiene-3,20-dione.

6. A 1,4,9(11)-pregnatriene of the formula

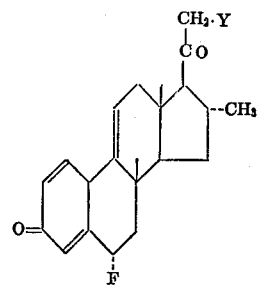

(II)

wherein Y is chlorine or fluorine.

7. A compound as defined in claim 6 which is 6α-fluoro-21 - chloro - 16α - methyl - 1,4,9(11) - pregnatriene-3,20-dione.

8. The compound which is 6α-fluoro-21-chloro-9,11β-epoxy-16α-methyl-9β-pregna-1,4-diene-3,20-dione.

9. A compound as defined in claim 6 which is 6α,21-lifluoro-16α-methyl-1,4,9(11)-pregnatriene-3,20-dione.

10. The compound which is 6α,21-difluoro-9,11β-epoxy-16α-methyl-9β-pregna-1,4-diene-3,20-dione.

References Cited
UNITED STATES PATENTS 3,502,700   3/1970   Krakower et al. ___ 260—397.45
3,663,579   5/1972   Stacke et al. _____ 260—397.45

ELBERT L. ROBERTS, Primary Examiner

U. Cl. X.R.

260—397.45, 397.3; 424—241, 243